(12) United States Patent
Foster et al.

(10) Patent No.: US 9,724,794 B1
(45) Date of Patent: Aug. 8, 2017

(54) MACHINE TOOL PROTECTION

(71) Applicant: KERR MACHINE CO., Sulphur, OK (US)

(72) Inventors: Kelcy Jake Foster, Ardmore, OK (US); Guy J. Lapointe, Sulphur, OK (US); Mark S. Nowell, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 136 days.

(21) Appl. No.: 14/607,735

(22) Filed: Jan. 28, 2015

Related U.S. Application Data

(60) Provisional application No. 61/932,695, filed on Jan. 28, 2014.

(51) Int. Cl.
| | |
|---|---|
| *B23Q 11/08* | (2006.01) |
| *G05B 19/414* | (2006.01) |
| *B23Q 11/00* | (2006.01) |
| *B23Q 13/00* | (2006.01) |
| *B23B 25/06* | (2006.01) |

(52) U.S. Cl.
CPC .......... *B23Q 11/08* (2013.01); *G05B 19/4145* (2013.01); *B23B 25/06* (2013.01); *B23Q 11/00* (2013.01); *B23Q 13/00* (2013.01); *Y10T 82/2506* (2015.01); *Y10T 82/2587* (2015.01); *Y10T 409/30392* (2015.01); *Y10T 409/303864* (2015.01)

(58) Field of Classification Search
CPC . Y10T 408/05; Y10T 408/37; Y10T 82/2506; Y10T 82/25872; Y10T 409/3039; B23B 31/001; B23B 2231/28; B23B 2260/058; B23B 2231/44; B23Q 11/08; B23Q 13/00

USPC .............................. 206/305, 349; 279/76, 79
See application file for complete search history.

(56) References Cited

U.S. PATENT DOCUMENTS

| | | | | | |
|---|---|---|---|---|---|
| 4,576,069 | A | * | 3/1986 | Bazuin .................. | B23Q 11/08 408/2 |
| 5,066,176 | A | * | 11/1991 | Johnstone ............. | B23Q 17/20 33/504 |
| 5,846,036 | A | * | 12/1998 | Mizoguchi ............ | B23Q 13/00 279/125 |
| 2011/0121523 | A1 | * | 5/2011 | Erickson ............... | B23B 31/107 279/76 |

FOREIGN PATENT DOCUMENTS

| | | | | |
|---|---|---|---|---|
| JP | 09155683 | A | * | 6/1997 |
| JP | 2008188764 | A | * | 8/2008 |
| JP | 2009125855 | A | * | 6/2009 |
| JP | 2009136957 | A | * | 6/2009 |

* cited by examiner

*Primary Examiner* — Sunil K Singh
*Assistant Examiner* — Nicole N Ramos
(74) *Attorney, Agent, or Firm* — Tomlinson McKinstry, P.C.

(57) ABSTRACT

An apparatus and associated method for operating a machine tool having a selectively movable turret and a tool mounted to the turret. A cover is configured to be removably secured to the turret and sized so that the cover encloses the tool when the cover is secured to the turret. Turret control logic includes computer instructions stored in a computer memory and executable by a computer processor to limit movement of the turret when the cover is secured to the turret.

10 Claims, 9 Drawing Sheets

US 9,724,794 B1

MACHINE TOOL PROTECTION

RELATED APPLICATIONS

This application claims the benefit of the filing date of U.S. provisional application Ser. No. 61/932,695 filed on Jan. 28, 2013.

FIELD

The present embodiments relate generally to machine tool operations and more particularly, without limitation, to protecting a tool used in a machine tool.

BACKGROUND

Touch-probes (probes) are commonly used in computer-numeric-control (CNC) machine tools to perform workpiece inspection operations. A probe is typically mounted in a tool holder to an indexable turret, among a plurality of other cutting and inspection tools. In some CNC machine tools, the turret is remotely positioned away from the manufacturing environment, so the tools not presently being used are not exposed to the cutting debris. However, in some CNC machine tools like most CNC lathes, all of the tools are at all times exposed to the manufacturing environment. That means that at all times when the probe is not being used, it is nonetheless constantly exposed to heavy chips striking the probe, long stringy chips attaching to the probe and pulling against the probe when the turret moves, and machining coolant accumulating on the probe. These issues can damage the probe, reduce probe accuracy, interfere with probe communication, increase the cost of using a probe, and increase machine downtime.

What is needed a solution that individually protects a tool, such as a probe, from the manufacturing environment debris during machine tool operations that do not employ the protected tool. It is to that need that the embodiments of the present technology are directed.

SUMMARY

Some embodiments of the claimed technology contemplate an apparatus for individually protecting a tool that is operably mounted to a turret of a machine tool. The apparatus includes a cover that is configured to be removably secured to the turret and sized so that the cover encloses the tool when the cover is secured to the turret.

Some embodiments of the claimed technology contemplate a machine tool having a selectively movable turret and a tool mounted to the turret. A cover is configured to be removably secured to the turret and sized so that the cover encloses the tool when the cover is secured to the turret. Turret control logic includes computer instructions stored in a computer memory and executable by a computer processor to limit movement of the turret when the cover is secured to the turret.

Some embodiments of the claimed technology contemplate a method that includes: mounting a tool in a computer-numeric-controlled (CNC) turret of a machine tool; and securing a cover to the turret to individually enclose the tool.

DETAILED DESCRIPTION

Initially, it is to be appreciated that this disclosure is by way of example only, not by limitation. The tooling concepts herein are not limited to use or application with any specific system or method that employs the components as specifically arranged in the illustrative embodiments of the described technology. Thus, although the instrumentalities described herein are for the convenience of explanation, shown and described with respect to exemplary embodiments, it will be appreciated that the principles herein may be applied equally in other types of machine systems and methods. For example, without limitation, the tooling technology disclosed herein by preferred embodiments can likewise be employed in technology other than a computer-numeric-controlled (CNC) machine tool, such as in robotics generally.

The skilled artisan gains the knowledge from the disclosed preferred embodiments such that an enumeration of all possible applications of this technology is not necessary to readily ascertain the scope of the claimed technology. Similarly, the configurations of the type of tooling in the disclosed embodiments for performing the claimed technology are merely illustrative of the contemplated embodiments and not in any way limiting of the claimed technology.

Figure 1:
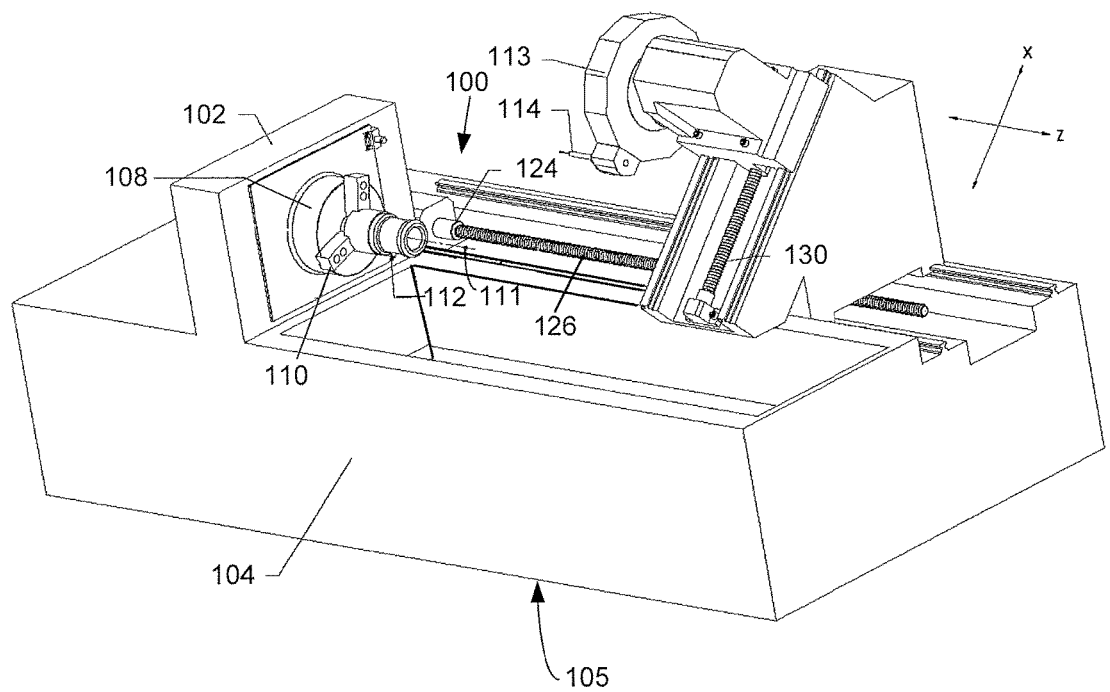
FIG. 1 diagrammatically depicts a CNC lathe that is constructed in accordance with illustrative embodiments of the present invention.

FIG. 1 diagrammatically depicts a CNC machine 100 that is constructed in accordance with illustrative embodiments of the present technology. Although these illustrative embodiments depict the claimed technology employed in a horizontal CNC lathe 100, the claimed technology is not so limited. The skilled artisan having read the disclosure of this description readily ascertains that the claimed technology can alternatively be employed in other types of CNC machines such as a milling machine or a coordinate measuring machine, or in robotics generally, and the like.

The CNC lathe 100 as depicted in FIG. 1 has a headstock 102 and a longitudinally extending bed 104, together forming a structural frame 105 supporting all the working components for the respective intended purposes. A spindle (not depicted) is journalled for rotation in the headstock 102. A chuck 108 is attached to a distal end of the spindle and is affixed in rotation with the spindle. The chuck 108 includes moveable jaws 110 that are openable to define a central cavity large enough to insert a workpiece 112. After inserting the workpiece 112, the jaws 110 are depicted in the closeable position, thereby frictionally engaging the outer surface of the workpiece 112 to selectively rotate the workpiece 112 in unison with the chuck 108 around an axis of rotation 111. The contemplated embodiments are not limited to these illustrative embodiments in which the chuck 108 grips against the outer surface of the workpiece 112. In alternative embodiments the chuck 108 can be configured to otherwise grip an inner surface, such as an inside diameter, or other workable surfaces.

Figure 2:
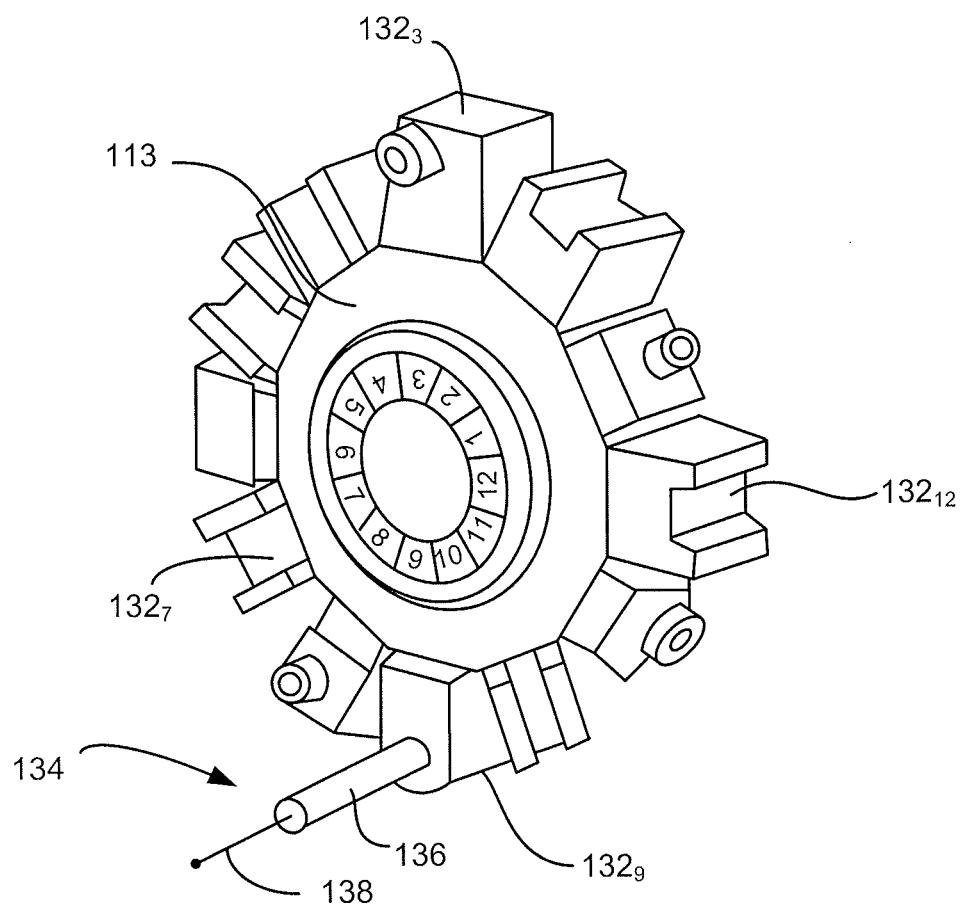
FIG. 2 is an isometric depiction of the turret in FIG. 1.

The CNC lathe 100 has a turret 113 that is selectively moveable along a z-axis by a threaded engagement with a lead screw 126, and that is simultaneously moveable along an x-axis by a threaded engagement with another lead screw 130. FIG. 2 is an isometric depiction of illustrative embodiments in which the turret 113 supports twelve various tool holders $132_i$. The tool holders 132 are designed for mounting different types of cutting tools such as a boring bar, a drill, a threading tool, a parting tool, and the like to the turret 113. The turret 113 is selectively indexable to position any of the tool holders 132 in an operating position in order to perform programmed manufacturing operations on the workpiece 112.

Figure 3:
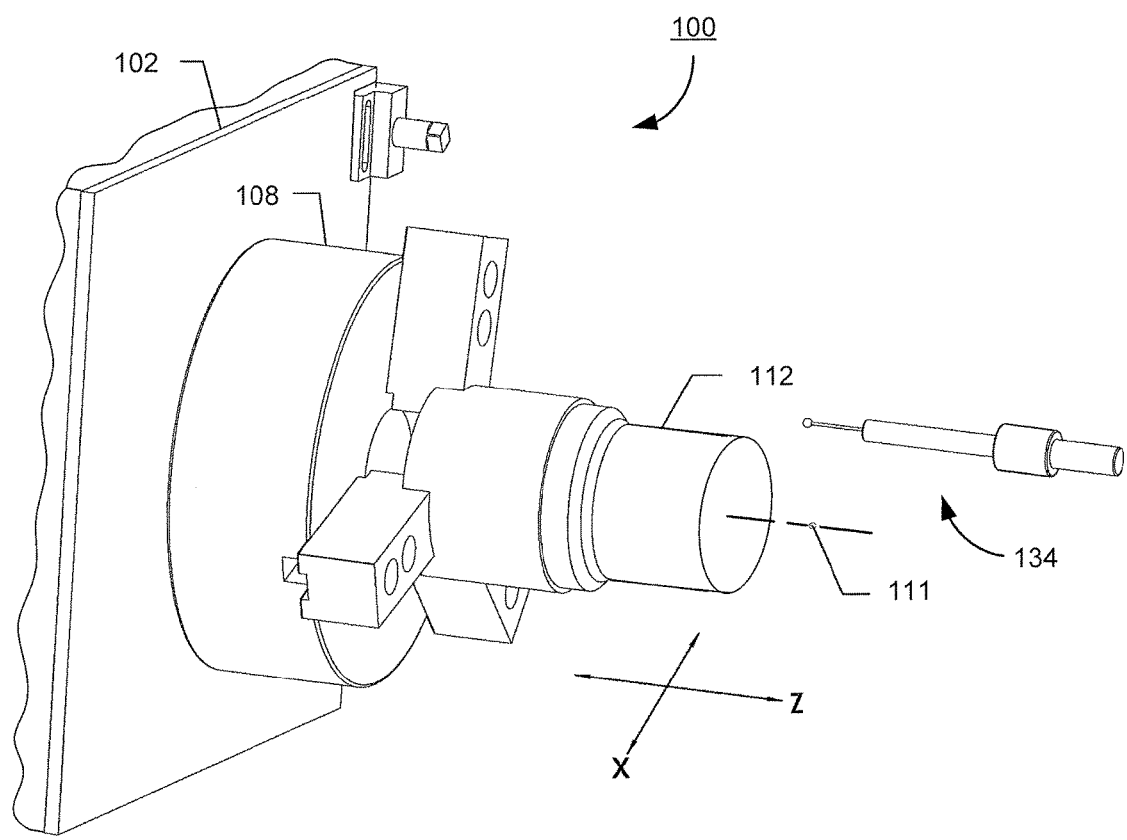
FIG. 3 is an enlarged isometric depiction of a portion of the CNC lathe in FIG. 1.

In this technology one (or more) of the tool holders 132 can be used to mount a measuring tool in order to perform various quality control operations on the workpiece 112 during manufacturing. For example, FIG. 2 depicts a tool holder $132_9$ supporting a touch-probe 134, such as a model OMP 60 touch probe that is commercially available from Renishaw, a world-wide company with headquarters in the United Kingdom. The touch-probe (probe) 134 generally has a body 136, from which extends a deflectable stylus 138. Deflection of the stylus 138 sends a signal to the CNC lathe 100 indicating the stylus 138 has been moved into contact with a surface of the workpiece 112. The signal can be an electronic voltage signal, an optical signal, a radio frequency (RF) signal, and the like. The CNC lathe 100 is programmed to correlate the signal from the probe 134 with its coordinate positioning system, so that the coordinate location of the contact is used in measuring the workpiece 112. The inspection operations discussed herein refer to comparing the measurements to predefined specifications to determine whether the workpiece is manufactured in conformance to the specifications (within tolerance). FIG. 3, for example, depicts how the turret 113 (not depicted) moves the probe 134 according to a programmed path that approaches and then contacts a desired surface of the workpiece 112, such as the outside diameter of the depicted workpiece 112. In that case, the CNC lathe 100 uses the x-axis coordinate where contact is made to calculate the diameter of the workpiece 112.

Figure 4:
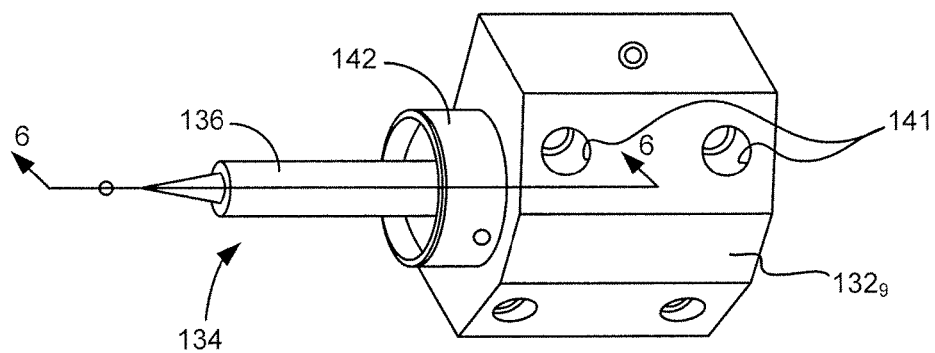
FIG. 4 is an enlarged isometric depiction of one of the tool holders attached to the turret in FIG. 2.

FIG. 4 is an enlarged and slightly reoriented isometric depiction of a portion of FIG. 2. The tool holder $132_9$ is mounted to the turret 113 (FIG. 2) by bolts (not depicted) passing through clearance holes 141 (a four-hole pattern depicted) to threadingly engage the turret 113. In these illustrative embodiments the tool holder $132_9$ is a standard-sized, commercially available tool holder designed for mounting a standard-size boring bar. To adapt to the standard equipment, in these illustrative embodiments the probe 134 is mounted to a tool holder sleeve (sleeve) 142 which is, in turn, mounted to the tool holder $132_9$.

Figure 5:
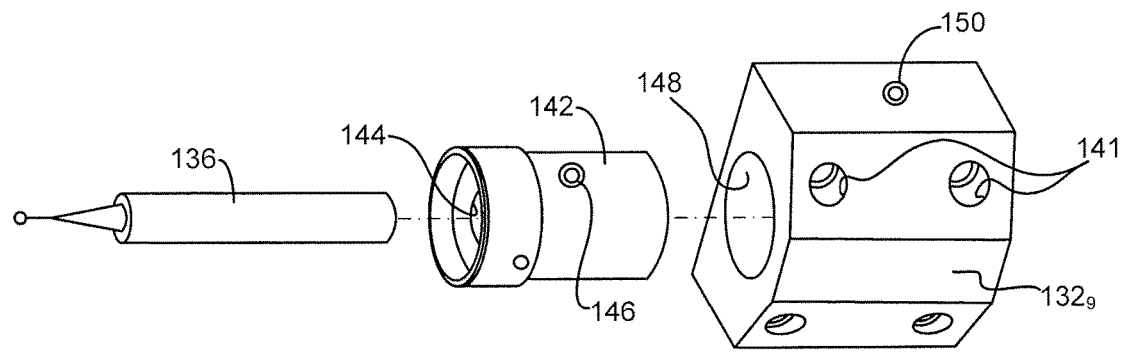
FIG. 5 is an exploded isometric depiction of FIG. 4.

FIG. 5 is an exploded isometric depiction of FIG. 4. The sleeve 142 defines a bore 144 that is sized to form a close mating engagement with a cylindrical shank 136 defined by the probe 134. With the probe 134 inserted into the bore 144, a set screw 146 can be advanced into the bore 144 to mount the probe 134 to the sleeve 142. In a similar manner, the tool holder $132_9$ defines a bore 148 that is sized to form a close mating engagement with a cylindrical shank defined by the sleeve 142. With the sleeve 142 inserted into the bore 148, a set screw 150 can be advanced into the bore 148 to mount the sleeve 142 to the tool holder $132_9$.

Figure 6:
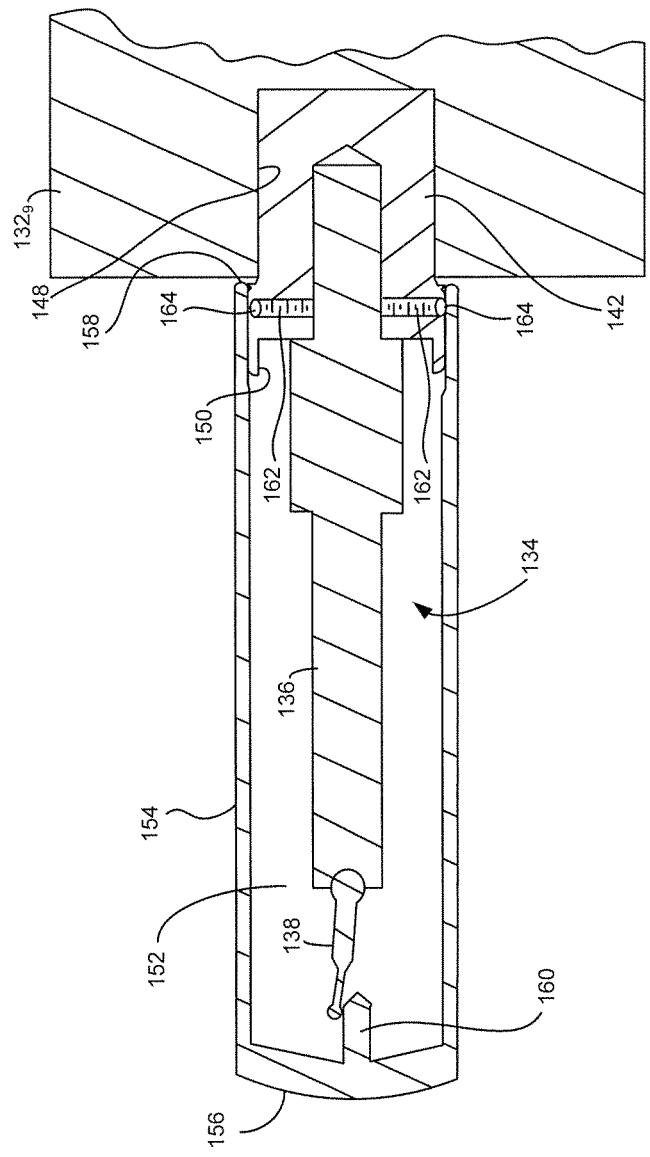
FIG. 6 is a diagrammatical cross-sectional depiction taken along the section line 6-6 in FIG. 4.

FIG. 6 is a diagrammatic cross-sectional depiction taken along the section line 6-6 in FIG. 4. The sleeve 142 defines an enlarged opening 150 to accommodate the receiving engagement of the probe 134 into the sleeve 142. The skilled artisan will appreciate that by this construction the sleeve 142 is secured to the tool holder $132_9$ which is, in turn, secured to the turret 113. A cover 152 is configured to be removably secured directly to the sleeve 142, and hence removably secured to the turret 113 by this construction. The cover 152 in these illustrative embodiments has a longitudinally-extending cylindrical body 154, a closed end 156, and an open end 158. The open end 158 is configured to frictionally attach to the sleeve 142 and sized to enclose the probe 134 when the cover 152 is secured to the turret 113. A protuberant member 160 extends from the closed end 156 into the cavity defined by the body 154. In these illustrative embodiments the body 154, end 156, and member 160 are unitarily constructed, but the contemplated embodiments are not so limited. The skilled artisan understands that in alternative embodiments the end 156 can be a separate component attached to the body 154, and likewise the member 160 can be a separate component attached to the end 156.

The member 160 is sized and positioned to deflect the stylus 138 (to transmit a nonzero reading) when the cover 152 is secured to the turret 113. The CNC lathe 100 can be programmed to implement a lockout routine in the machine tool operations if a nonzero reading from the probe 134 is received, as depicted in FIG. 6. That provides protection against the operator mistakenly failing to remove the cover 152 from the turret 113 before starting a programmed machine cycle. Such a mistake can result in the cover 152 crashing into the workpiece 112, causing damage to the probe 134. The computer programming can proactively compensate for all occasions where a crash is likely to occur in the cover 152 is not removed, by sensing the probe signal 174 to ensure the cover 152 is removed before moving the turret 113.

Some probes 134 can operate without the protuberant member 160. Signal transmissions from an optical probe, for example, can reliably be blocked by simply securing the cover 152 to the turret 113. In that case, the CNC lathe 100 can be programmed to establish a lockout of operations if no signal is received from the probe 134. However, signal transmissions from an RF probe, for example, can penetrate the cover 152 making the displacement of the stylus 138 a reliable solution for informing the CNC lathe 100 that the cover 152 is secured to the turret 113.

The sleeve 142 in these illustrative embodiments supports two opposing biasers 162. The biasers 162 can simply be unitarily formed detents protruding from the cylindrical surface of the sleeve 142. However, for improved wear performance preferably the biaser 162 is constructed of a deflectable protuberance, such as the ball plunger construction diagrammatically depicted in FIG. 6. The cover 152 defines indentations 164 aligned with the biasers 162 when the cover 152 is in the secured position. In that position, the ball plungers (in these embodiments) are biased into the indentations 164, thereby frictionally urging the cover 152 to remain secured to the turret 113.

Figure 7:
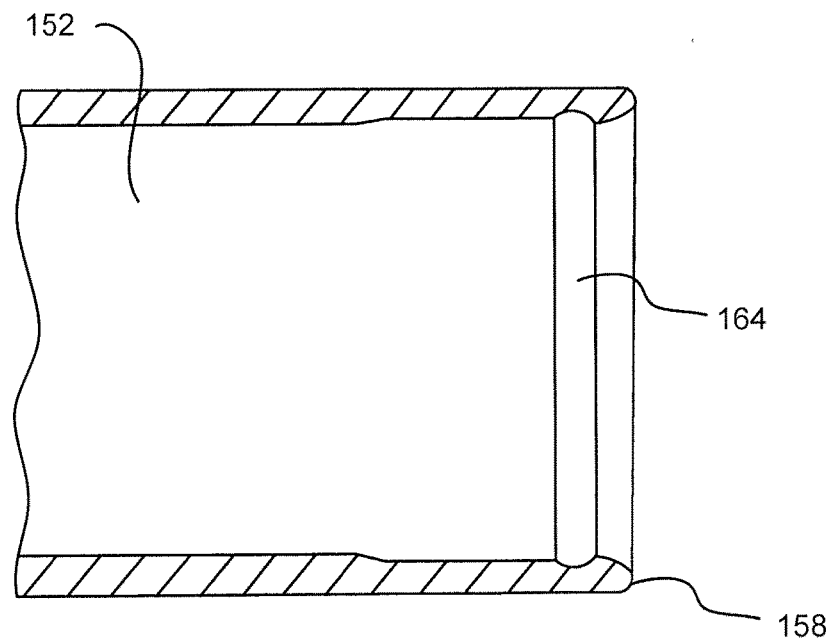
FIG. 7 is an enlarged depiction of the open end of the cover in FIG. 6.
Figure 8:
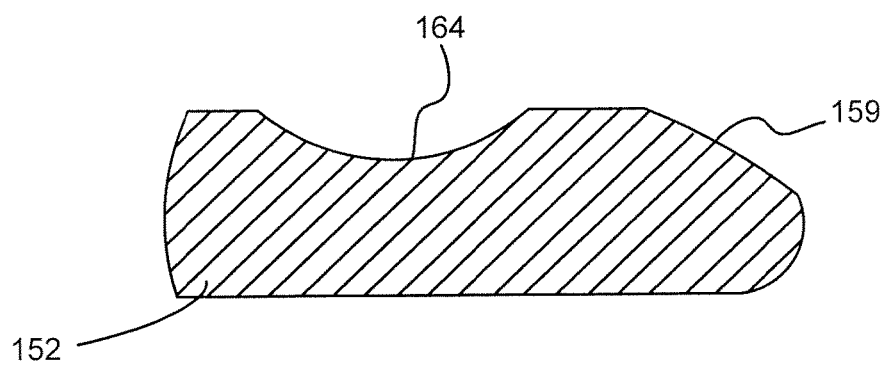
FIG. 8 is an enlarged depiction of the leading edge of the open end in FIG. 7.

FIG. 7 is an enlarged depiction of the open end 158 of the cover 152, and FIG. 8 an even larger detail of the leading edge of the open end 158. Preferably, the indentations 164 are portions of a continuous groove 164 formed inside the cover 152 so that this frictional engagement is achieved at all rotational orientations of the cover 152. The open end 158 defines a chamfered leading edge 159 to facilitate the placement of the open end 158 around the sleeve 142. Although in these illustrative embodiments the biaser 162 is supported by the sleeve 142 and the indentation 164 is defined by the cover 152, the contemplated embodiments are not so limited. In alternative embodiments the biaser can be supported by the cover and the indentation can be defined by the sleeve.

Figure 9:
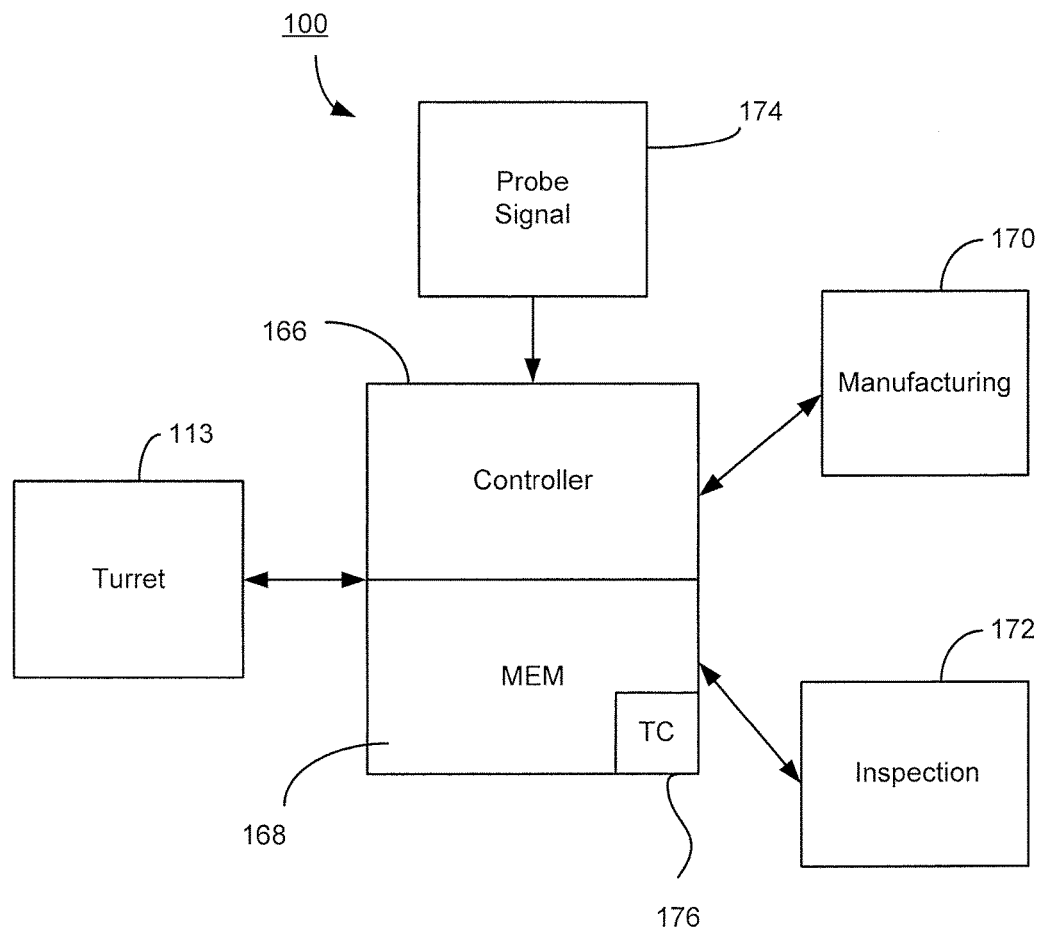
FIG. 9 is a block depiction of the programmable computer processor operations of the CNC lathe in FIG. 1.

FIG. 9 depicts a functional block diagram of the control system for the CNC lathe 100. A processor-based controller (computer processor) 166 executes computer instructions stored in a computer memory 168 to perform top-level control of all manufacturing operations 170 and inspection operations 172 of the CNC lathe 100. The computer processor 166 operates in part responsively to the signal 174 received from the probe 134. For purposes of this description and meaning of the claims, any disclosure that the processor 166 performs an operation means that the computer processor 166 is configured to execute computer instructions that are stored in the memory 168 in order to perform the operation as described. For example, the computer processor 166 responds to a programming call for inspecting the workpiece 112 by indexing the turret 113 to make the probe 134 operable and selectively moveable to perform the programmed tool path steps of an inspection operation 172. Before advancing the turret 113, the computer processor 166 executes turret control (TC) logic 176 which is stored in the memory 168 to limit movement of the turret 113 in accordance with this technology.

Figure 10:
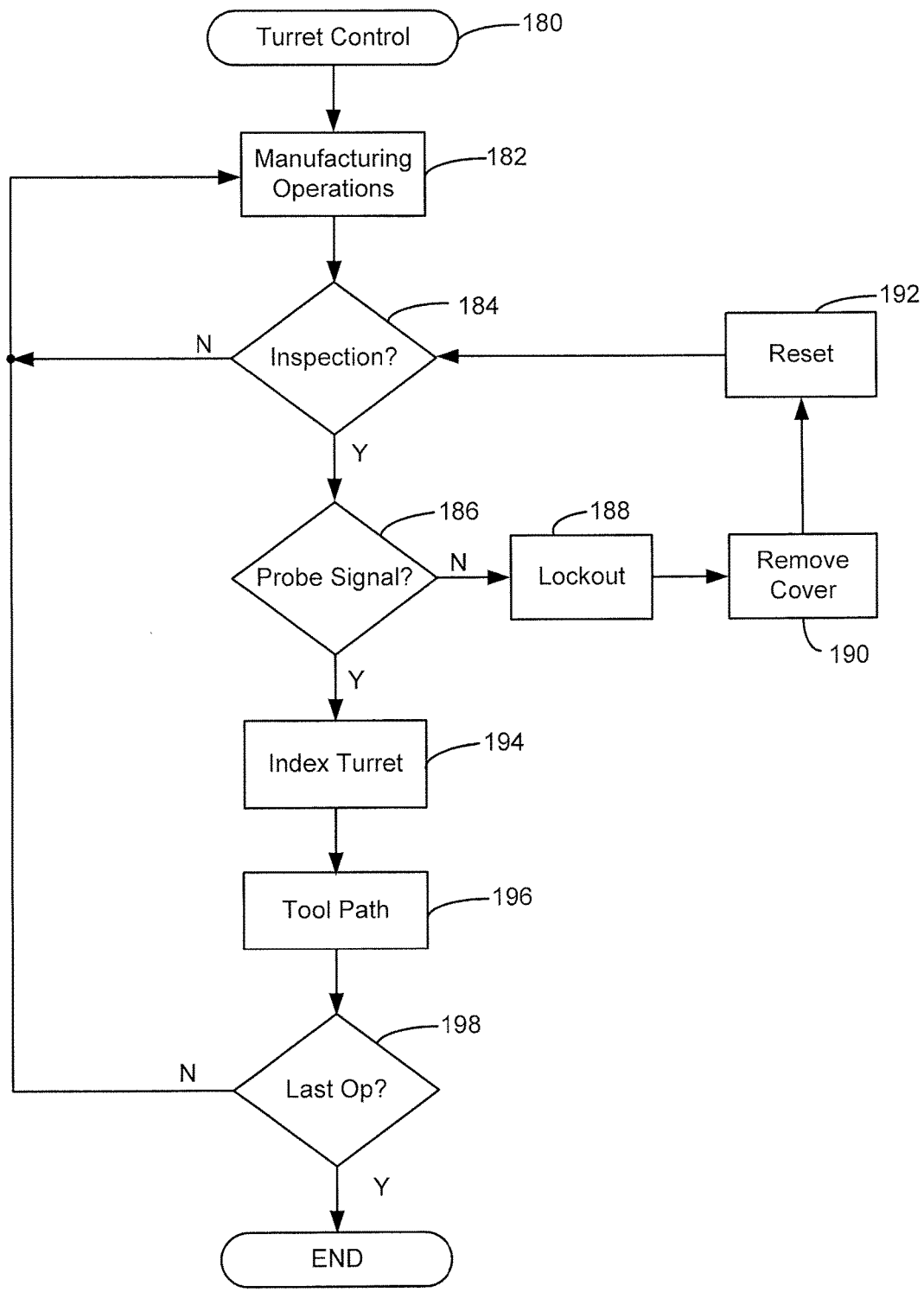
FIG. 10 is a simplified flowchart depicting steps in a TURRET CONTROL method performed by the computer processor in accordance with this technology.

FIG. 10 is a simplified flowchart depicting steps of a TURRET CONTROL method 180 the computer processor performs by executing the TC logic. The method 180 is invoked during manufacturing operations 182 when a query in block 184 determines that a programmed call for an inspection operation has occurred. Block 186 then determines whether the probe signal is satisfied, indicating that the cover has already been removed from the turret. In the illustrative embodiments of FIG. 6 that means the probe signal indicates the probe is zeroed (non-deflected) because the removed cover no longer deflects the stylus.

If the determination of block 186 is "no," then in block 188 the processor electronically locks out the CNC lathe 100, preventing any movement of the turret. In block 190 the operator is informed, such as by visual and/or audio warning, that the cover must be removed before operations can continue. After removing the cover, in block 192 the operator resets the controls to override the lockout, and control returns to block 184.

If the determination of block 186 is "yes," then in block 194 the processor indexes the turret to make the probe operable, and then in block 196 the processor guides the probe along the programmed tool path and obtains the programmed inputs to perform the inspection operation. Block 198 determines whether the last operation has been executed; if not then control returns to block 182, else the method ends.

Figure 11:
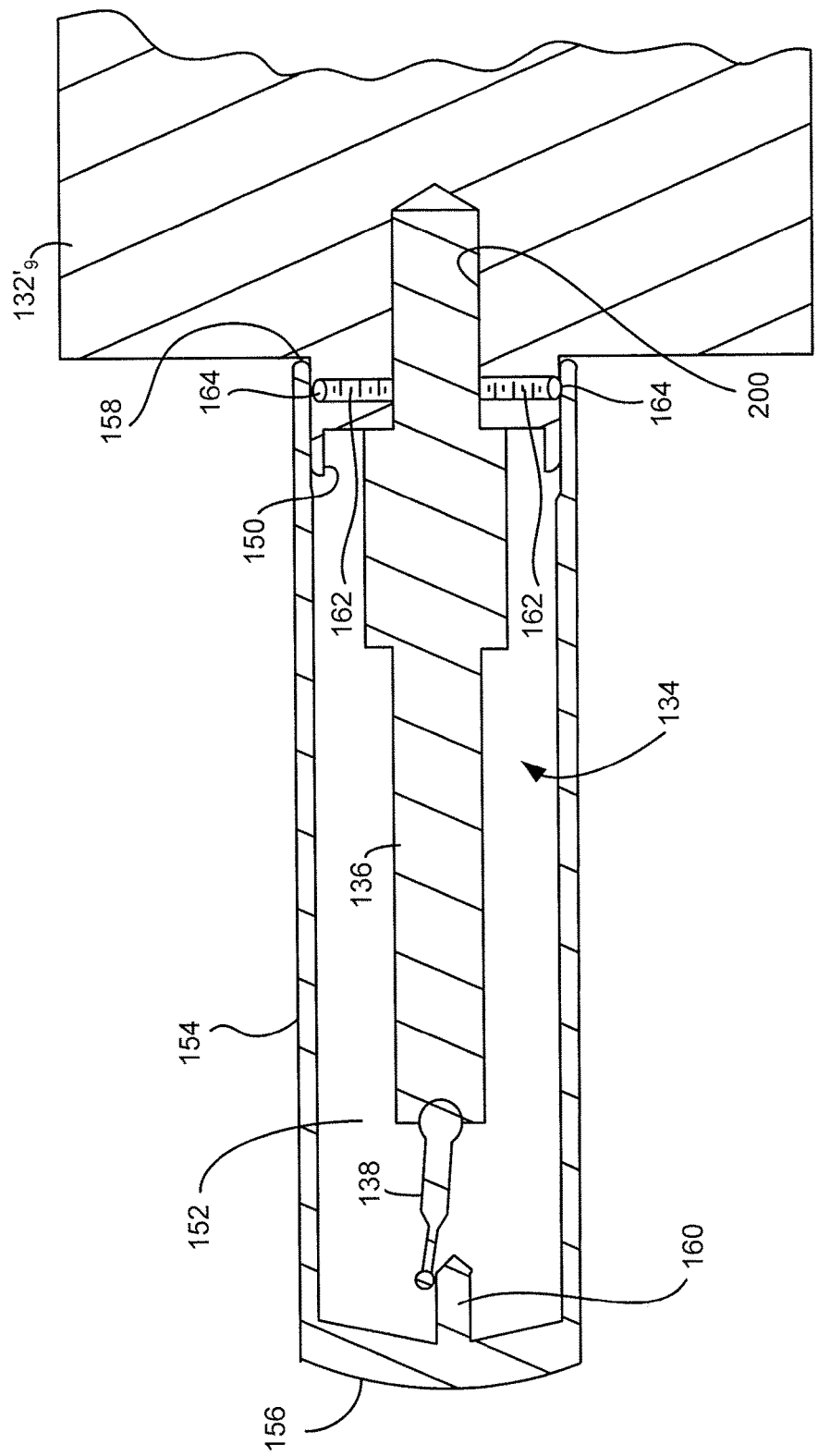
FIG. 11 is similar to FIG. 6 but depicting an alternative construction in accordance with this technology.

FIG. 11 is similar to FIG. 6 except that the tool block 132₉' is customized for direct contacting attachment of both the probe 134 and the cover 152 to the tool block 132₉'. The tool block $132_9'$ defines a bore 200 that is sized for a close mating engagement with the probe 134. The tool block $132_9'$ also defines a protuberant portion supporting the biasers 162 and sized to function like the attaching portion of the sleeve 142 as described herein.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the skilled artisan readily understands that the principles of individually covering a tool among a plurality of tools on a turret can be equivalently applied to other types of inspection tools and the cutting tools alike. Furthermore, the TC logic can be adapted to decide which of a plurality of different turret index locations requires removal of the cover before allowing further movement of the turret.

What is claimed is:

1. An apparatus for individually protecting a probe having a movable stylus that is operably mounted to a turret of a machine tool, the apparatus comprising:
   a cover sized to deflect the stylus when the cover is secured to the turret;
   wherein the cover is configured to be removably secured to the turret and sized so that the cover encloses the probe when the cover is secured to the turret.

2. The apparatus of claim 1 comprising a biaser configured to impart a frictional force urging the cover to remain secured to the turret.

3. The apparatus of claim 2 wherein the machine tool includes a tool holder configured to be connected to the turret, and wherein the apparatus comprises a tool holder sleeve that is configured to be connected to the tool holder.

4. The apparatus of claim 3 wherein the biaser comprises a deflectable protuberant member supported by one of the tool holder sleeve and the cover.

5. The apparatus of claim 4 wherein the other of the tool holder sleeve and the cover defines an indentation aligned with the deflectable protuberant member when the cover is secured to the turret.

6. The apparatus of claim 5 wherein the deflectable protuberant member is biased into the indentation when the cover is secured to the turret.

7. The apparatus of claim 2 wherein the biaser comprises a ball plunger.

8. The apparatus of claim 4 wherein the deflectable protuberant member is supported by the tool holder sleeve, and wherein the indentation is defined by a continuous groove in the cover.

9. The apparatus of claim 1 wherein the cover defines a chamfered open end.

10. The apparatus of claim 3 wherein the tool holder sleeve defines a mounting feature that is configured to connect the tool to the tool holder sleeve.

* * * * *